United States Patent
Swinderman

(10) Patent No.: US 7,367,443 B2
(45) Date of Patent: May 6, 2008

(54) CONVEYOR BELT CLEANER SYSTEM AND METHOD OF MANUFACTURING SAME

(75) Inventor: Robert Todd Swinderman, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 78 days.

(21) Appl. No.: 10/996,957

(22) Filed: Nov. 24, 2004

(65) Prior Publication Data

US 2006/0108202 A1 May 25, 2006

(51) Int. Cl.
*B65G 45/12* (2006.01)

(52) U.S. Cl. ............... 198/497; 198/494; 198/499; 15/256.5; 474/92

(58) Field of Classification Search ........... 198/494, 198/497, 499; 15/256.5; 474/92
See application file for complete search history.

(56) References Cited

U.S. PATENT DOCUMENTS

| | | | |
|---|---|---|---|
| 4,131,194 A | 12/1978 | Andersson | |
| 4,269,301 A | 5/1981 | Gibbs | |
| 4,290,520 A | 9/1981 | Rhodes | |
| 4,344,525 A | 8/1982 | Bancroft | |
| 4,402,394 A | 9/1983 | Stoll | |
| 4,541,523 A | 9/1985 | Stockton | |
| 4,598,823 A | 7/1986 | Swinderman | |
| 4,643,293 A | 2/1987 | Swinderman | |
| 4,779,716 A | 10/1988 | Gordon | |
| 4,787,500 A | 11/1988 | Holz | |
| 4,825,996 A | 5/1989 | Davidts | |
| 4,854,443 A | 8/1989 | Gordon | |
| 4,953,689 A * | 9/1990 | Peterson et al. | 198/497 |
| 4,962,845 A * | 10/1990 | Gibbs | 198/499 |
| 5,011,002 A | 4/1991 | Gibbs | |
| 5,016,746 A | 5/1991 | Gibbs | |
| 5,197,587 A * | 3/1993 | Malmberg | 198/497 |
| 5,201,402 A | 4/1993 | Mott | |

(Continued)

FOREIGN PATENT DOCUMENTS

GB 2221440 A 2/1990

OTHER PUBLICATIONS

Copending U.S. Appl. No. 10/996,830, filed Nov. 24, 2005, having common ownership and a common inventor with the present U.S. Appl. No. 10/996,957.

(Continued)

*Primary Examiner*—Gene O. Crawford
*Assistant Examiner*—Leslie A Nicholson, III
(74) *Attorney, Agent, or Firm*—Thompson Coburn LLP

(57) ABSTRACT

A conveyor belt cleaner system and method of manufacturing the same comprising a common component support frame, and key components of: mounting bar, blade support and scraper blade wherein the scraper blade is removably secured within a reusable blade support so as to allow replacement of the scraper blade. Key components are manufactured at a first manufacturing location in long, standardized lengths and incorporated with the common component at a second location for assembly. The key components included standardized guide markings for cutting the key components into segments and aligning key components with one another. A plurality of apertures consisting of holes and slots are uniformly displaced along the key components to facilitate alignment of the components during assembly and securing of the components with fixing elements.

40 Claims, 15 Drawing Sheets

U.S. PATENT DOCUMENTS

| | | |
|---|---|---|
| 5,222,589 A | 6/1993 | Gordon |
| 5,301,797 A | 4/1994 | Hollyfield, Jr. |
| D347,918 S | 6/1994 | Gibbs |
| 5,344,000 A | 9/1994 | Gleason |
| 5,413,208 A | 5/1995 | Veenhof |
| 5,556,201 A * | 9/1996 | Veltrop et al. .............. 366/203 |
| 5,573,102 A | 11/1996 | Puchalla |
| 5,647,476 A | 7/1997 | Veenhof |
| 5,655,642 A | 8/1997 | Lawrences |
| 5,887,702 A | 3/1999 | Mott |
| 5,979,638 A | 11/1999 | Wiggins |
| 5,992,614 A | 11/1999 | Mott |
| 6,050,621 A * | 4/2000 | Martinez et al. ............ 292/289 |
| 6,056,112 A | 5/2000 | Wiggins |
| 6,179,114 B1 | 1/2001 | Brink |
| 6,182,816 B1 | 2/2001 | Gibbs |
| 6,296,105 B1 | 10/2001 | Carnes |
| 6,315,105 B1 | 11/2001 | Gibbs |
| 6,321,901 B1 | 11/2001 | Strebel |
| 6,354,428 B1 * | 3/2002 | Gibbs et al. ................ 198/497 |
| 6,360,875 B1 | 3/2002 | Altemus, Jr. et al. |
| 6,374,990 B1 | 4/2002 | Swinderman |
| 6,401,911 B1 | 6/2002 | Swinderman |
| 6,457,575 B2 | 10/2002 | Swinderman |
| 6,581,754 B2 | 6/2003 | Law |
| 6,591,969 B2 | 7/2003 | Swinderman |
| 6,612,419 B1 | 9/2003 | Watson |
| 6,968,940 B2 | 11/2005 | Wiggins |
| 2004/0149544 A1 | 8/2004 | Dal Ferro |
| 2005/0269470 A1 * | 12/2005 | Ficarra et al. .............. 248/304 |

OTHER PUBLICATIONS

Copending U.S. Appl. No. 11/078,824, a continuation-in-part of the present U.S. Appl. No. 10/996,957.

International Search Report and Written Opinion in PCT/US2005/042586, mailed Aug. 8, 2006. This PCT application claims priority to both the present U.S. Appl. No. 10/996,957 and the above-identified copending U.S. Appl. No. 11/078,824.

Non-final Office Action in copending U.S. Appl. No. 10/996,830.

The International Preliminary Report on Patentability (Chapter II of the Patent Cooperation Treaty) mailed Aug. 7, 2007, in International application No. PCT/US2005/42586 published Jun. 13, 2006. The PCT application claims priority to the present U.S. Appl. No. 10/996,957 and to U.S. Appl. No. 11/078,824.

Notices of Allowance & Allowability mailed Sep. 21, 2007 in connection with co-pending U.S. Appl. No. 10/996,830, filed Nov. 24, 2004, having a common inventor with the present U.S. Appl. No. 10/996,957.

* cited by examiner

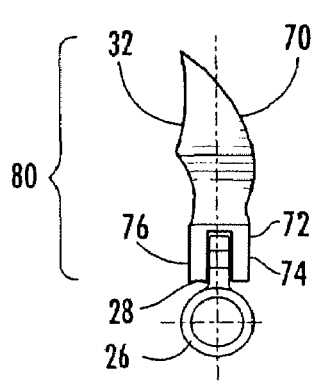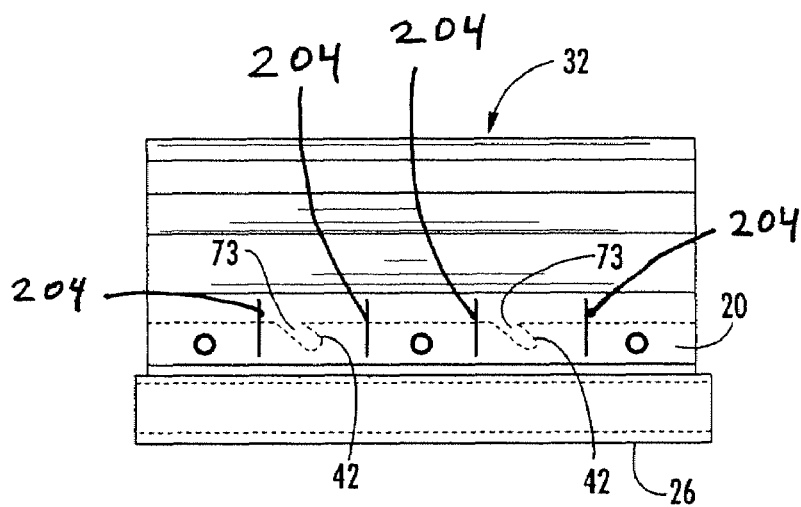
FIG. 9a        FIG. 9b
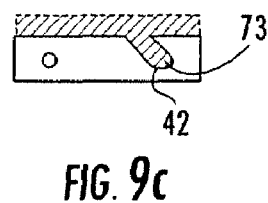
FIG. 9c

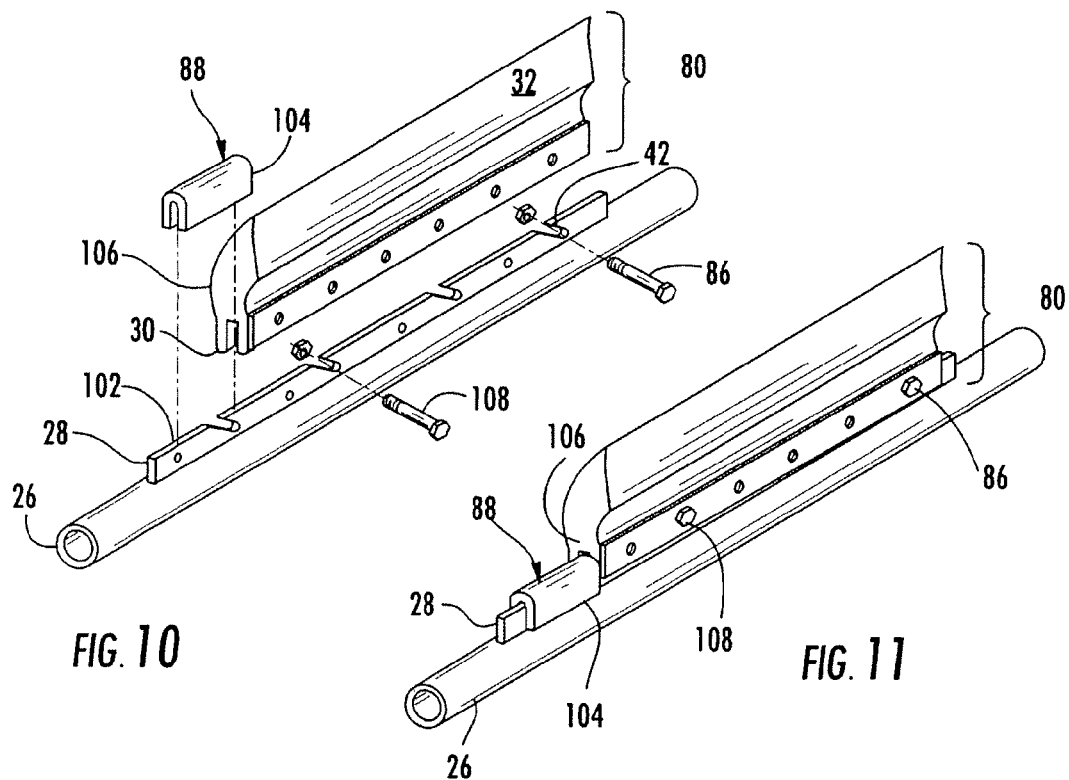
FIG. 10
FIG. 11
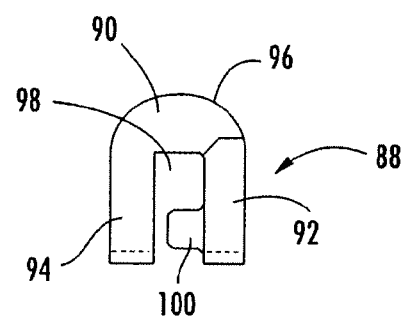
FIG. 12

CONVEYOR BELT CLEANER SYSTEM AND METHOD OF MANUFACTURING SAME

BACKGROUND OF INVENTION

The present invention is directed to a primary and secondary conveyor belt cleaning system wherein a replaceable scraper blade is removably secured within a reusable blade support. The system includes such "key components" such as blades, and/or blade supports and/or mounting bars which are manufactured and inventoried in longer than needed "standard lengths" by the manufacturer, to be later "cut to size" and combined with "common components" such as locally available pipe or tubing serving as a support member, post-manufacture by the distributor or end user. This serves to economize on manufacturing and inventory costs.

The system further includes: separable scraper blades and supports; reusable blade supports; pin, clip, retainer and/or shoulder-bolt blade fixing systems; and components machined with guide grooves and measurement demarcation for ease of alignment, assembly and cutting of components to custom sizes.

1. Conventional Belt Cleaners

Conveyor belt cleaners are used to remove materials that cling to the return run of belt conveyors after the conveyor has discharged its cargo. The cargo can be units such as letters or cartons or it can be a bulk solid such as sand or gravel. The material that does not discharge from the belt at the desired discharge locations through the action of gravity or centrifugal force accumulates on components or finds its way into the environment, causing productivity, safety and cleanliness problems.

Conveyor belt cleaners have also required the use of external tensioners which actuate the scraper blades into biased engagement with the conveyor belt. A tensioner of various types is used to impart torque to the frame thus engaging it with the conveyor belt and maintaining contact throughout the life of the blade. Most tensioners require intermediate adjustment during the wear life of the blade to maintain optimum blade cleaning performance.

The blade components of conveyor belt cleaners wear out with use and need to be replaced periodically. Several manufacturers such as Argonics®, ASCGO®, ARCH®, FLEXCO® and Applicant's MARTIN® QC#1™ product have provided "quick change" cleaners which attempt to facilitate the process of blade replacement. Typically, in such conventional "quick change systems" a one-piece blade assembly sits on an upstanding flange which is supported by a frame typically made of round or rectangular steel tubing. The blade of such conventional "quick change" systems is held on the flange by 2 pins, usually one at each end. One pin is easily removable for quick service. Another typical retaining means is a fixed pin at one end and a removable pin at the same end. An aluminum extrusion is molded to the urethane blade in such conventional systems by a series of steps that require metal preparation and bonding agents.

The existing blade designs are made of cast polyurethane with an extruded aluminum support molded into the base that corresponds to the upstanding flange. An aluminum extrusion is used because complex configurations can be extruded to mechanically lock the urethane to the aluminum in addition to chemical bonding. The aluminum extrusion is usually cut to length prior to molding and either a slot or hole machined at each end to accept the retaining means.

Pre-engineered belt cleaners, wherein the belt cleaners are custom made to size for a particular application subject to the particular belt specifications of the end user, have been popularized over the last 25 years. There is now a proliferation of mechanical belt cleaning devices marketed by dozens of firms with domestic and international marketing capabilities. Because of the now accepted benefits of using engineered belt cleaners, there is a substantial volume of sales and pressure from the market for lower priced equipment with improved quality and performance. Several elements of the inventive belt cleaner disclosed and claimed herein address these industry needs.

Pre-engineered belt cleaners are exclusively marketed as "made to order" items in various assembly lengths to match standard belt widths. Applicant's QC#1™ system is an example of an economical engineered belt cleaner. The QC#1™ belt cleaner is a one-pin blade fixing and replacement system wherein the belt cleaner is installed on the conveyor belt head pulley.

Belt widths are standardized in the United States and are established by the Conveyor Equipment Manufacturers Association (CEMA). Imperial belt widths are generally in 6 inch increments starting at 6 inches up to 144 inches. The metric belt width standards are nominally set by the European ISO committees that specialize in conveyor belting. Metric belt widths are in increments of 100 mm and 150 mm starting from 150 mm and going up to 3000 mm wide belts. Thus there are over 50 standard belt cleaner sizes that must be manufactured, packaged and shipped to cover both markets. Most manufacturers use distributors to reach the end users. However, some sell direct, by mail order catalog or local sales representatives.

The current state of the art offers several blade widths equal to or shorter than the belt width. Belt width minus 50 mm, 75 mm or 150 mm and, belt width minus 2-inches, 3-inches or 6-inches are the most common.

To reduce inventory and improve delivery time most manufacturers offer additional engineered belt cleaner designs that are matrices of common components that are mounted on support structures. Normal intervals are one common subassembly for every 100 mm or 150 mm and 4-inches or 6-inches of belt width. In this way all of the common belt widths can be accommodated and only the support structure has to be made to size. Some of the simple designs use a single blade rather than a multiple of common sub components. However, in such cases the manufacturer still manufactures the blade "to size" performing the necessary machining and molding to adapt the blade to the customer length support structure. Pipe and square mechanical tubing are commonly used for support structures. While there is no formal industry standard, pipe sizes of 1½ inch or 2 inch iron pipe are commonly used. Some manufacturers ship the products completely assembled and others ship at the component level. Most shipments to the end user are at least partially assembled to reduce the chance of missing parts or shipping errors.

Additionally, there currently is an after-market for replacement part sales. Accordingly, manufacturers tend to price their replacement parts in such a way that the distributor can not increase its profit without the manufacturer benefiting in the increased margins by buying parts and assembling cleaners "to order" at its facility. Thus, most of the belt cleaners are currently shipped in "made to order" sizes either to the distributor or directly to the end user.

Accordingly, the prior art made to order belt cleaners have drawbacks when it comes to such things as: the need to make, store and ship many different sizes of cleaners and blades; wasted material; inefficiency; and longer than desired delivery times and shipping charges.

In order to address the problem of the over 50 standard belt cleaner sizes needed to accommodate both metric and imperial measurement belt width standards, the system of the present invention reduces: manufacturing costs; inventory; delivery time; inefficiency and waste, while providing end users with customized solutions closer to the point and time of use and making it easier to anticipate and prepare for reorders of the key components.

2. The Current Invention

Thus, the present invention provides a "quick change" primary and secondary belt cleaning system that allows for faster delivery to the end user, and reduced costs and waste, while allowing the distributor or end user to supply commonly available components to be combined with the key components supplied by the manufacturer in standard lengths such as 2700 mm (106.3 inches) lengths, so as to be cut to length by the distributor or end user at the location of assembly.

Under the system of the present invention, the Original Equipment Manufacturer ("OEM") or Distributor stocks standard lengths of key components such as blades, and/or blade supports, and/or mounting bars. The OEM, end user or Distributor supplies the common components comprising the pipe or tubing to be used as the support structure and cuts the key and common components to the desired length. The OEM, end user or Distributor likewise welds the mounting bar to the pipe and assembles and installs the completed cleaner. Hence, the key components are supplied to the end user, OEM or Distributor in long lengths that can be cut to size and fabricated at point of use and no sooner than needed.

By molding the blade in longer than needed lengths the manufacturing cost is reduced. By supplying such standard lengths of blade, blade support and mounting bar, inventory is reduced from the approximately 50 sizes or so currently offered in the industry to only one standard size. By completing the assembly immediately prior to use the work in progress investment is lower and the ability to determine the needed size and deliver the right size is enhanced. Since the most common belt sizes range between 600 mm to 1200 mm and, 24 inches to 48 inches, several combinations of blade sizes can be cut to size from the standard length of the blade with minimized waste. The same is true with respect to the standard length blade supports, and mounting bars.

By offering such key components (blade, blade support and mounting bar) in standard lengths, the purchasing, ordering and inventory costs are greatly reduced. Inventory is reduced since only the standard length of key components need be manufactured, stored and shipped. Because such key components are manufactured, inventoried and shipped in only the standard, longer than needed lengths, it is easier for the manufacturer to predict and time the preparation and shipment of replacement key components based on sales histories and trends. By moving the assembly process from the manufacturing plant to as close to the end user and installation as possible, delivery time to the end user is thereby also reduced.

The current invention further provides for selling and shipping kits containing pre-cut key components and corresponding tensioners in a limited number of the most popular sizes of belt cleaners at the point of sale, (POS), outlets such as mine supply stores for combination with the readily available support frame structural elements. This avoids the need to manufacture, stock and ship over 50 standard belt cleaner sizes while still (1) accommodating the current belt width standards; (2) reducing: inventory; costs; delivery time; inefficiency and waste; and, (3) while providing end users with the ability to customize solutions, while making it easier for the manufacturer to forecast and prepare for reorders of the key components.

SUMMARY OF INVENTION

A first embodiment of the present invention comprises a blade assembly for a conveyor belt cleaner wherein the blade assembly comprises a first scraper blade releasably and removably attached to a blade support having a longitudinal axis. The blade support is configured to mate to the first scraper blade and is further configured to disengage the first scraper blade upon the application of a force sufficient to separate the first scraper from the blade support in a direction substantially perpendicular to the longitudinal axis and away from the blade support and to releasably mate with a second scraper blade.

One embodiment of the present is a blade assembly for a conveyor belt cleaner comprising a scraper blade operably connected to a mounting assembly wherein the mounting assembly is configured to maintain the scraper blade in an operative position in communication with a conveyor belt. The mounting assembly comprises a mounting bar for releasable attachment of the scraper blade thereto with the mounting bar configured to enable replacement of the scraper blade, and being reusable. A blade support is operably interposed between said blade and the mounting bar and is operably configured thereto so as to removably and releasably receive the scraper blade. The blade support is further configured to operably attach the scraper blade to the mounting bar.

The mounting bar further comprises a plurality of uniformly spaced apertures configured to receive a first fixing element operatively associated with the scraper blade for securing the scraper blade to the mounting bar. The plurality of uniformly spaced apertures can comprise an alternating pattern of slots and holes. The said apertures are spaced approximately 75 mm apart in this embodiment. The plurality of apertures comprises a first hole and a first slot in the mounting bar. The first fixing element comprises a shoulder bolt configured to be received by the first slot. The first fixing element alternatively comprises a pin configured to be received by the first hole or a retainer configured to be received by the first hole. Alternatively, the first fixing element comprises a lug integrally formed within the scraper blade, the lug configured to be received by the first slot. The conveyor belt cleaner further includes a second fixing element, the first fixing element configured to be received by the first slot and the second fixing element configured to be received by the first hole.

The scraper blade comprises a first through hole configured to align with the first slot in the mounting bar to facilitate insertion of the first fixing element through the first through hole and first slot to securely mate the scraper blade to the mounting bar. The mounting bar further comprises a plurality of uniformly separated guides disposed on the mounting bar, the guides configured to facilitate cutting of the mounting bar into segments and to facilitate aligning of the mounting bar with the scraper blade.

A blade support is configured to receive the scraper blade and to form a blade assembly, the blade support comprising a plurality of uniformly separated guides disposed on the blade support, the guides configured to facilitate cutting of the blade assembly into segments and to facilitate aligning of the blade assembly and mounting bar. Alternatively, the scraper blade comprises a first portion with a first hardness and a second portion with a second hardness.

In another embodiment of the present invention, the invention includes a first key component manufactured to a standardized length at a first point of fabrication and configured to be cut to a desired length at a second point of fabrication; and a first common component configured to be incorporated with the first key component at the second point of fabrication, the first and second points of fabrication being different locations. The first key component comprises a mounting bar and the first common component comprises a support frame. The first point of fabrication comprises the location of manufacture of the first key component. The second point of fabrication comprises the point of incorporation of the first key component and the first common component. The invention further includes a second key component consisting of a scraper blade and a third key component consisting of a blade support. The second key component and third key component are configured to be cut to a desired length at the second point of fabrication. The scraper blade and blade support are capable of being operably joined together. The blade support and the mounting bar are then operably connected.

At least one of the first, second or third key components is manufactured in standard lengths to be cut to fit at the second point of fabrication. The first common component is incorporated with the first, second and third key components at the second point of fabrication.

A method of the present invention for manufacturing a conveyor blade cleaner comprises: forming a scraper blade in a standard, longer than needed length; forming a mounting bar in a standard, longer than needed length; cutting the scraper blade and mounting bar to a desired length; attaching the mounting bar securely to a support frame; and attaching the scraper blade to the mounting bar in a secure, yet detachable manner, to enable replacement of the scraper blade.

The invention can also include the step of operably interposing a blade support between the scraper blade and the mounting bar prior to attaching the scraper blade to the mounting bar. The invention further include the forming of the scraper blade and the mounting bar taking place at a first location and the cutting of the scraper blade and mounting bar taking place at a second, different location.

The blade support is configured to be detachably joined with a scraper blade so as to be reusable. The blade support further includes markings to facilitate cutting thereof to a desired length. The blade support further includes a series of uniformly spaced holes to facilitate attachment of said scraper blade to said blade support. The blade support further includes a series of slots or holes in closely spaced uniform separation to facilitate attachment of a scraper blade thereto.

Another embodiment of the invention comprises: a) a mounting member comprising a first slot; and, b) a blade assembly comprising a scraper blade removably secured to a blade support, the blade support comprising a first securing member configured to slidably and removably engage the first slot. The invention comprises: a)key components manufactured in long lengths comprising: a mounting member comprising a first surface and a first plurality of apertures; a scraper blade comprising a first surface; and, a blade support configured to releasably engage the scraper blade and to securely fasten the blade support and scraper blade to the mounting member. The blade support comprises a first surface and a second plurality of apertures; and, b) cut marks at spaced intervals disposed along the first surfaces of the key components, the cut marks configured to enable cutting of the key components into shorter matched lengths with the first plurality of apertures and second plurality of apertures in substantially aligned relationship.

A method of assembling a conveyor belt cleaner for cleaning a surface of a conveyor belt, the method comprising the steps of: a) fixedly securing a scraper blade to a blade support, to form a blade assembly, the blade support comprising a first securing member; b) providing a mounting member with a first surface and a first aperture disposed in the first surface; c) sliding the blade assembly along the first surface until the first securing member is releasably engaged by the first aperture; and d) securing the blade assembly to the mounting member.

The method for providing to an end user the key components of a conveyor belt cleaner for cleaning a surface of a conveyor belt having a width, can alternatively comprise the steps of: a) manufacturing the key components in matching lengths corresponding to the conveyor belt width; b) pre-packaging the key components together in the matching lengths as a kit; and c) displaying the pre-packaged key components in said kit form at point of sale displays for retail sale to the end user.

The method for providing to an end user the key components of a conveyor belt cleaner for cleaning a surface of a conveyor belt comprises the steps of: a) cutting key components of the conveyor belt cleaner in matching long lengths, each key components comprising a first surface; b) making cut marks on the first surfaces of the key components at spaced intervals; c) providing the matching long lengths of key components to the end user for local assembly of the key components and fabrication of the conveyor belt cleaner.

The conveyor belt cleaner system for cleaning a surface of a conveyor belt, comprises: a) a blade assembly and mounting bar provided by a manufacturer; and b) a support frame configured to be constructed and operatively mated with the mounting bar by an end user of the conveyor belt cleaner.

This invention thus includes a blade for a conveyor belt cleaner having a mounting assembly with a longitudinal axis. It comprises a scraper blade capable of being operably connected to the mounting assembly for maintaining the scraper blade in an operative position in communication with a conveyor belt. A first retention region is disposed in the mounting assembly. The first retention region comprises a central axis extending the length of the retention region. The central axis is neither parallel nor perpendicular to the longitudinal axis of the mounting assembly. A first fixing region is integrally formed with the scraper blade and configured to be capable of being releasably received within the first retention region of the mounting assembly along the central axis, so as to in turn be capable of operably attaching the scraper blade to the mounting assembly. The scraper blade is capable of detaching from the mounting assembly along the central axis.

The fixing region comprises a lug integrally and transversely formed with the scraper blade. The first retention region comprises an angled, open-ended slot formed in the mounting bar. The angled slot is positioned 45 degrees from horizontal.

BRIEF DESCRIPTION OF DRAWINGS

FIGS. 9A-C show elevation views of an additional preferred embodiment of the present invention;

FIG. 10 shows an exploded perspective view of an additional preferred embodiment of the present invention;

FIG. 11 shows a perspective view of the preferred embodiment of the present invention shown in FIG. 10;

FIG. 12 shows a side elevation view of a component of the preferred embodiment of the present invention shown in FIGS. 10 and 11;

DETAILED DESCRIPTION OF DRAWINGS

Figure 1:
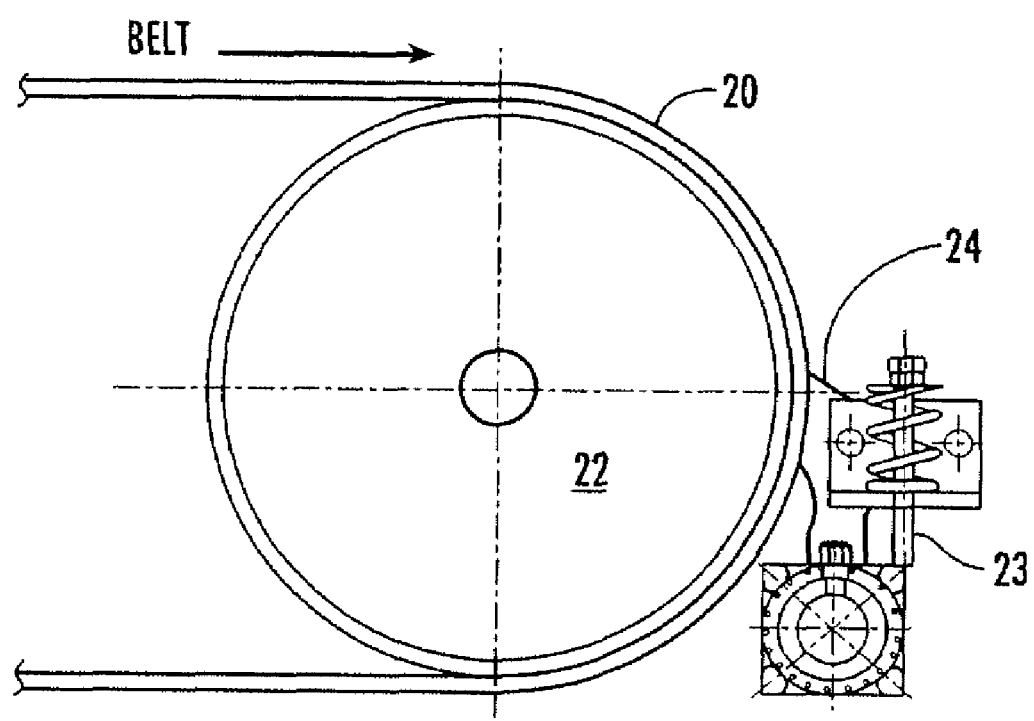
FIG. 1 shows a side elevation view of a conveyor belt cleaner and tensioner arrangement in accordance with a first preferred embodiment of the present invention.

A conveyor belt cleaner arrangement, as shown in FIGS. 1-4 and 6, is adapted for use in connection with a conveyor mechanism. The conveyor mechanism includes a rotatable endless conveyor belt 20 having an outer surface that is adapted to transport bulk material. The bulk material is discharged from the conveyor belt 20 at a generally cylindrical head pulley 22 about which the conveyor belt 20 is partially wrapped. The rotatable head pulley 22 and the discharge end of the conveyor belt 20 maybe located within a conveyor chute (not shown) which forms part of the conveyor mechanism. The conveyor chute includes a first chute wall (not shown) and a spaced apart and generally parallel second chute wall (not shown). The first and second chute walls form a chamber located there between in which the head pulley 22 and discharge end of the conveyor belt 20 are located.

A tensioner 23 of various types is used to impart torque to a conveyor belt cleaning assembly 24, thus engaging it with the conveyor belt 12 and maintaining contact of scraper blade 32 with the belt 12, throughout the life of the scraper blade 32. Most tensioners 23 require intermediate adjustment during the life of the blade to maintain optimum blade cleaning performance.

The conveyor belt cleaner assembly 24 includes a support frame 26, mounting bar 28, blade support 30, and scraper blade 32. One aspect of the present invention is the distinction between belt cleaner components that are "key components" manufactured in accordance with the disclosure herein and "common components" such as tubing or piping to be used as a support frame structure, comprising materials that are commonly available to the distributor or end user. The "key" belt cleaner components include the blade, blade support and/or mounting bar. The "common" belt cleaner component is the support frame as is described herein. The key components are manufactured in long, standard lengths such as 2700 mm (106.3 inches). This serves to keep manufacturing and inventory costs down and avoid waste of materials. Such key components are supplied by the manufacturer, whereas the common component is supplied by the OEM, Distributor or the end user of the assembly.

1. Belt Cleaner Component Details

Figure 6:
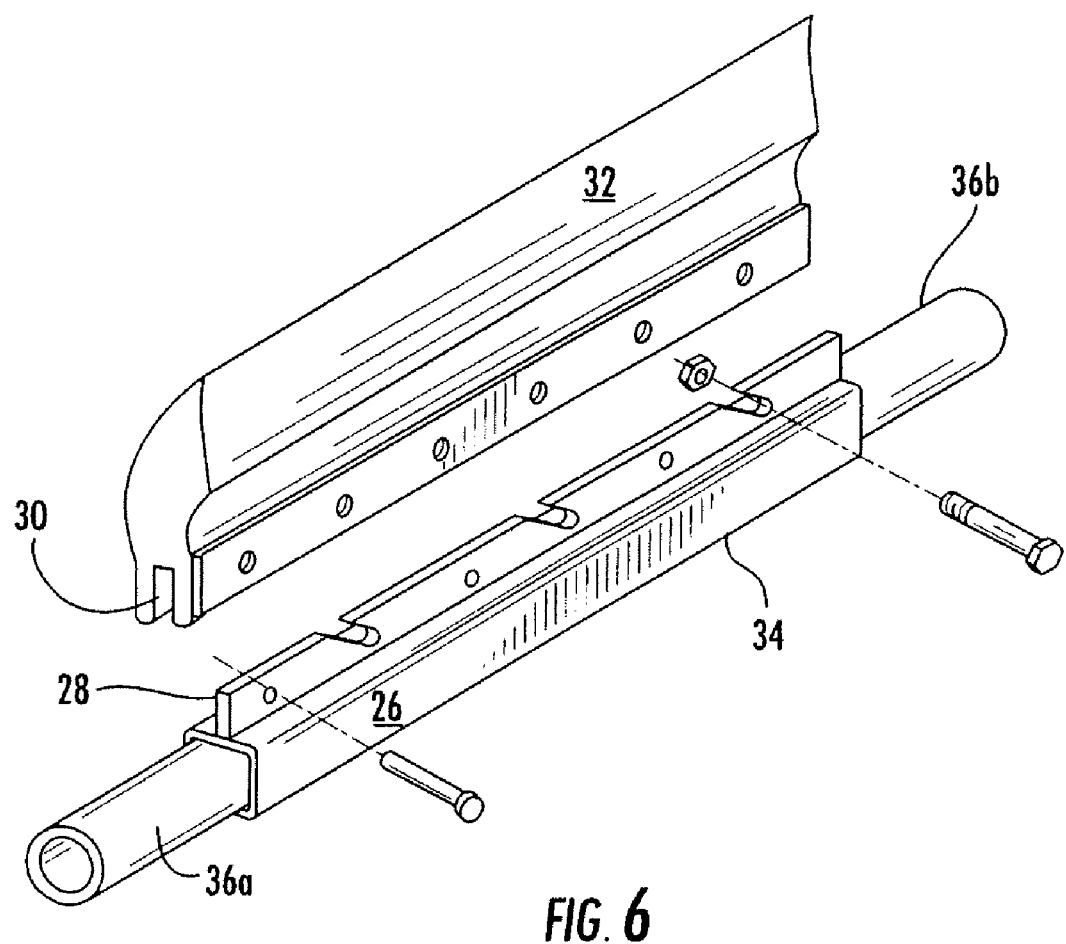
FIG. 6 shows a partial exploded perspective view of an additional preferred embodiment of the present invention.

The support frame 26 is a linearly extending support member that is preferably in the form of a circular pipe or bar. The pipe can be any suitable size pipe, but preferably is schedule 160, 1½ inch pipe (1.90 inch OD×0.4 inch wall or 48.3 mm×7.1 mm). In an alternative embodiment, as seen in FIG. 6, the support frame comprises a rectangular or square piece of structural steel 34 with circular or telescoping rods 36a, 36b mounted at the ends or a rectangular or square piece of structural steel 34 mounted concentrically on a circular rod or bar (not shown). In both embodiments, the ends of the support frame 26 extend through the first and second chute walls to facilitate mounting of the belt cleaner assembly 24 to the chute walls and incorporation of a tensioner or tensioners to maintain a constant scraper blade contact angle with the conveyor belt. The support frame 26 is characterized as a common component in accordance with the present invention due to: (1) the availability of schedule 160 piping at most steel supply service centers or pipe supply outlets, and (2) ease of fabrication of the component.

A mounting bar 28 (best seen in FIGS. 3-5) having top 38, front 40 and rear (not shown) surfaces and a longitudinal axis is securely mounted to the support frame 26 by appropriate means, preferably welding. Fasteners, glue or adhesive, or clamping may also be used to secure the mounting bar to the support frame. In a preferred embodiment, the mounting bar 28 is laser cut or stamped from ⅜ inch or 10 mm steel or stainless steel plate. Incorporated into the mounting bar is a plurality of retention regions comprising a series of alternating slots 42, each comprising a central axis extending the length of the slot, and holes 44 that extends through the width of the mounting bar from the front surface 40 to the rear surface. The retention regions facilitate secure attachment of the scraper blade 32 and blade support 30 (collectively the blade assembly 80) to the mounting bar 28 by interconnecting with corresponding fixing regions associated with the scraper blade, as will be described in detail below.

A preferred retention region pattern is alternating 12 mm diameter bores and 12 mm, 45 degree slots on 75 mm centers. This repeating pattern of alternating holes and slots allows for one support frame 26 to accommodate any desired blade-belt width combinations in convenient increments. With the present inventive system, an infinite number of belt width minus blade width combinations are possible because the blade and blade support can be cut to any length without compromising the fixing system. The blade support 30 can be made longer than the blade 32 to extend outside of the conveyor chute, making it easier and safer to remove the blade assembly because all of the fixing locations inside the chute can correspond to slot locations.

Figure 2:
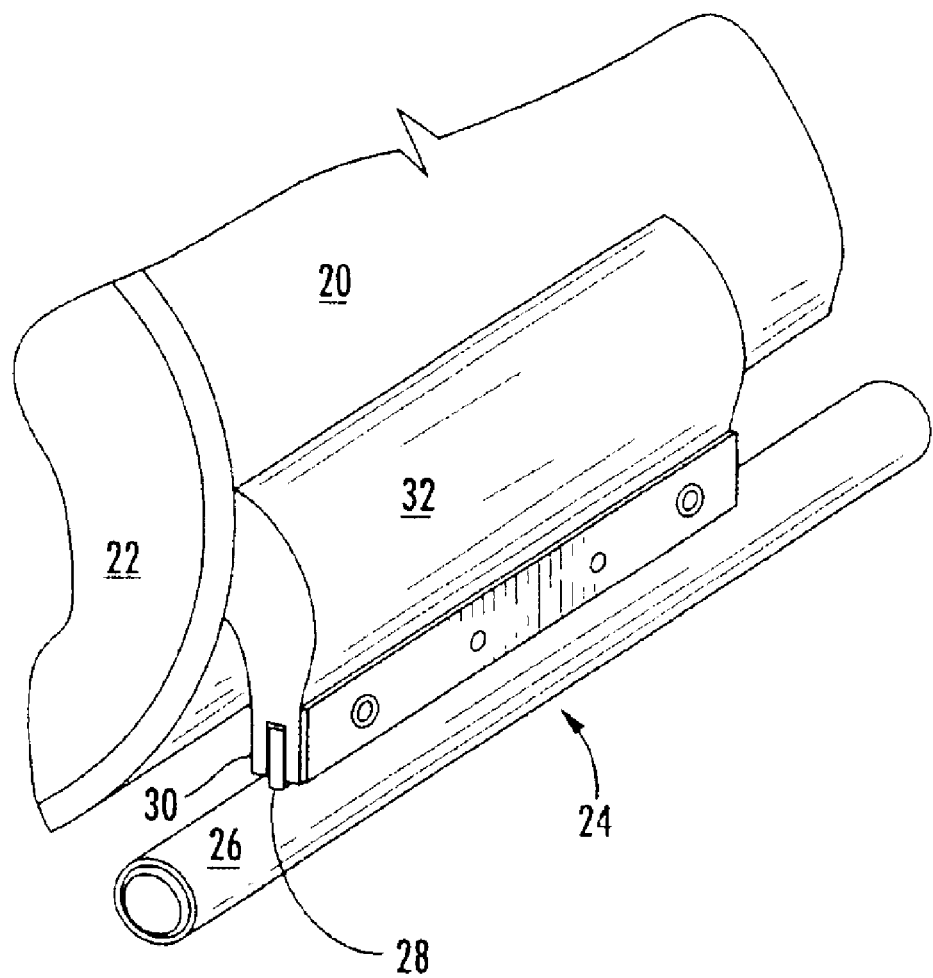
FIG. 2 shows a perspective view of a first preferred embodiment of the present invention.
Figure 7:
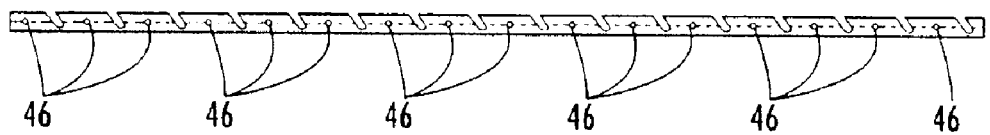
FIG. 7 shows a top plan elevation view of a component of the preferred embodiments of the present invention shown in FIGS. 2-6.

The mounting bar 28 also includes guides comprising cut marks 46 (FIG. 7) in the top surface 38 every 75 mm for convenience in cutting between the retention region locations and aligning the mounting bar 28 with other components of the conveyor belt cleaner 24 (FIG. 2). The cut marks 46 can take the form of small starter holes drilled into the top surface, ridges milled into the top, front or rear surface, or any other demarcations capable of providing cutting and alignment guidance.

The design of the mounting bar 28 in this embodiment is unique with an alternating slot 42 and hole 44 design. This design provides a range of flexibility for installing and removing the scraper blade 32. The current state of the art requires two fixing pin positions, either at each end of the mounting bar or in certain instances with both fixing pin positions at one end. On the existing mounting bar designs, the force on the blade 32 is primarily vertical and pins serve primarily as locator devices.

Figure 8:
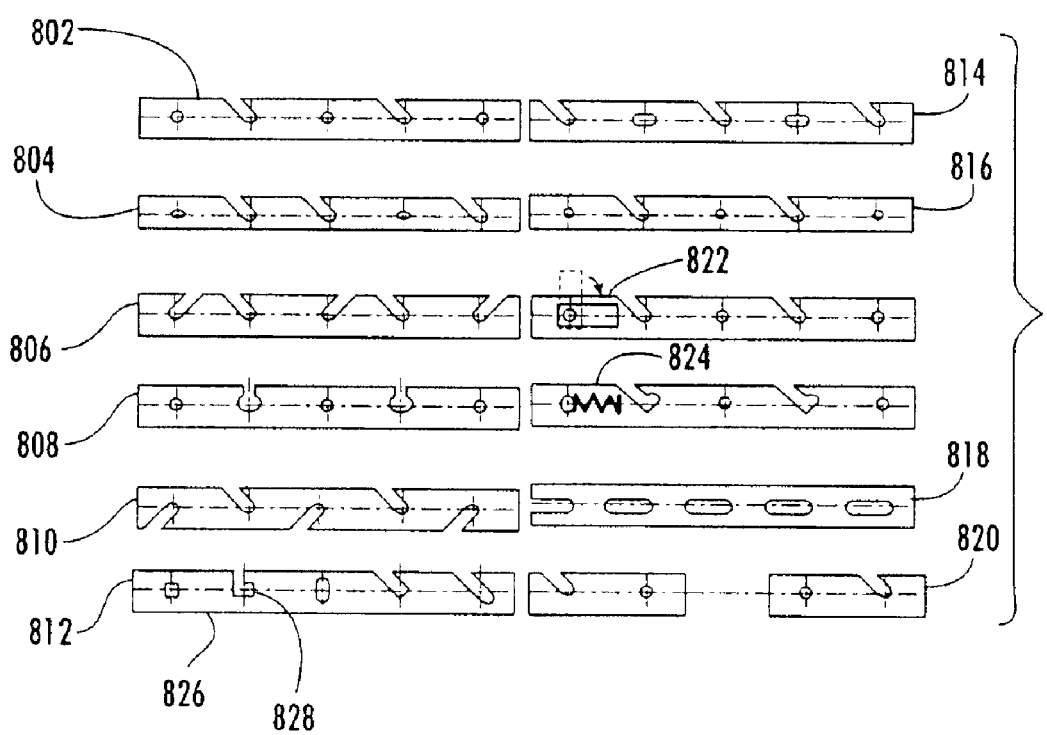
FIG. 8 shows additional preferred embodiment configurations of a component of the present invention shown in FIGS. 2-7.

As is shown in FIG. 8, the present invention contemplates the use of a variety of hole and slot patterns and arrangements comprising an alternating slot and hole pattern 802, hole and double slot pattern 804, apposed slots 806, hole and key hole pattern 808, upper and lower slots 810, randomly shaped slots and apertures 812 (i.e. square bore, dog-leg or L-shape slot, long bore, straight slot and key-hole slot), open slot and closed slot pattern 814, alternating aperture spacing intervals 816, long slots 818, stand alone tabs 820. FIG. 8 also shows alternate fixing regions incorporated with the mounting bar comprising a latch 822 or spring 824. The common element amongst the various patterns is the spacing of the apertures, slots, or the various combinations thereof on consistently repeating intervals. This facilitates use of the same blade and blade support components with multiple variants of mounting bars.

The fixing regions, in this embodiment comprise fasteners such as pins that correspond to the retention region locations in the mounting bar 28 can be permanently installed to the scraper blade assembly. The ability to install multiple permanent fasteners corresponding to the slot locations enables the blade support and blade connection to be made very strong. Additional connections allow unconventional uses of the system for alternate uses such as belt plows, diverter plows and snub pulley cleaners where the pressure on the blade is a combination of vertical and horizontal loads. The hole and slot design of the preferred embodiment mounting bar requires only one removable pin passing through a hole to securely attach the blade assembly to the mounting bar. The alternating pattern of slots and holes are adapted to slidably engage the blade assembly. The fixing regions can also comprise a shoulder bolt configured to slidably engage retention regions comprising angled slots to secure the blade assembly to the mounting bar, where the assembly action is parallel to the central axis extending the length of the slots.

Additionally, in applications where a truly "quick change" is required, i.e., for quick process changes, or where the consequences of a blade coming off the mounting bar are minimal, (i.e., open conveyors dumping on a stock pile, portable construction conveyors,) aligning all the fixing pins with corresponding slots in the mounting bar allows instantaneous removal and replacement of the blade assembly.

The support frame 26 and mounting bar 28 structures have been described as comprising steel or stainless steel raw materials. However, it is contemplated that these components can be fabricated from materials other than metal, such as fiberglass or plastic. The components can be comprised of a combination of fabrications and extrusions that are glued, clamped, welded or screwed together, provided that the raw materials selected and pieces fabricated are capable of performing in the desired environment, i.e., withstanding stresses applied from the tensioner or exposure to the conveyed materials. A variety of corrosion protection coatings such as paints are often applied to steel components to increase their usable life.

Figure 3:
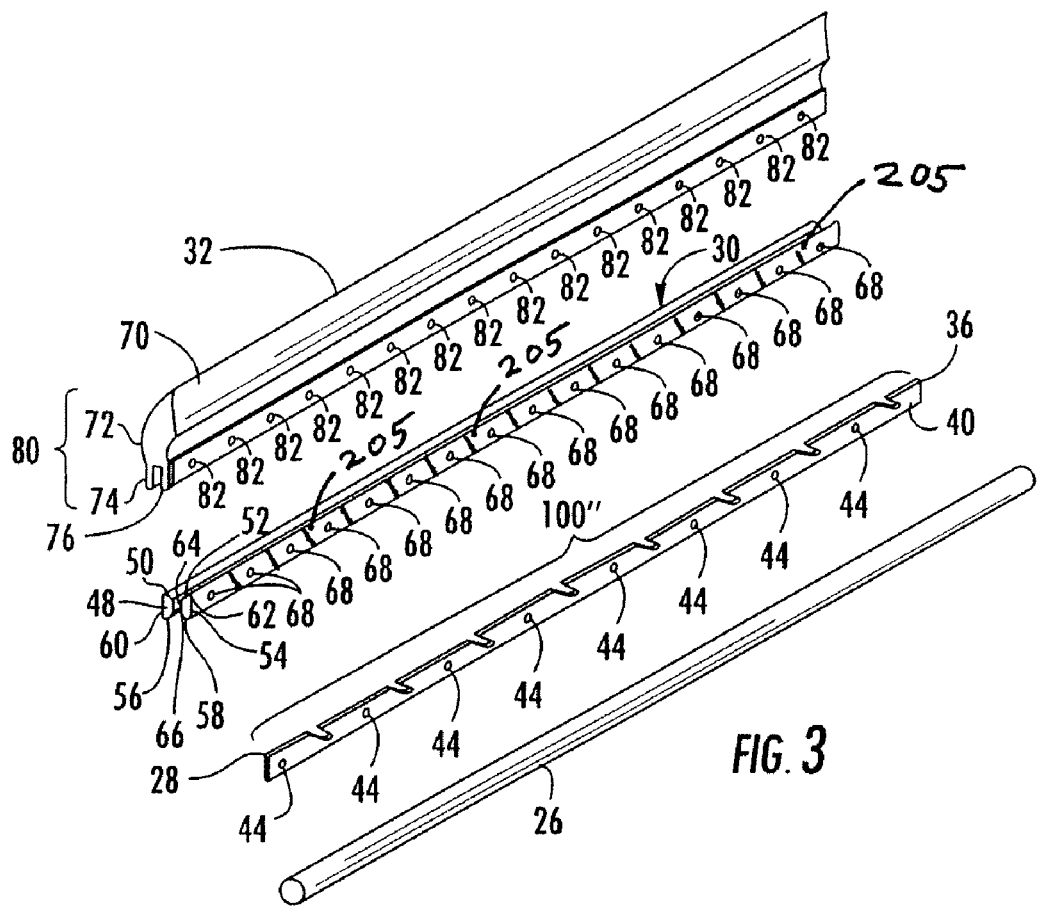
FIG. 3 shows an exploded perspective view of the preferred embodiment of the present invention shown in FIG. 2.
Figure 4:
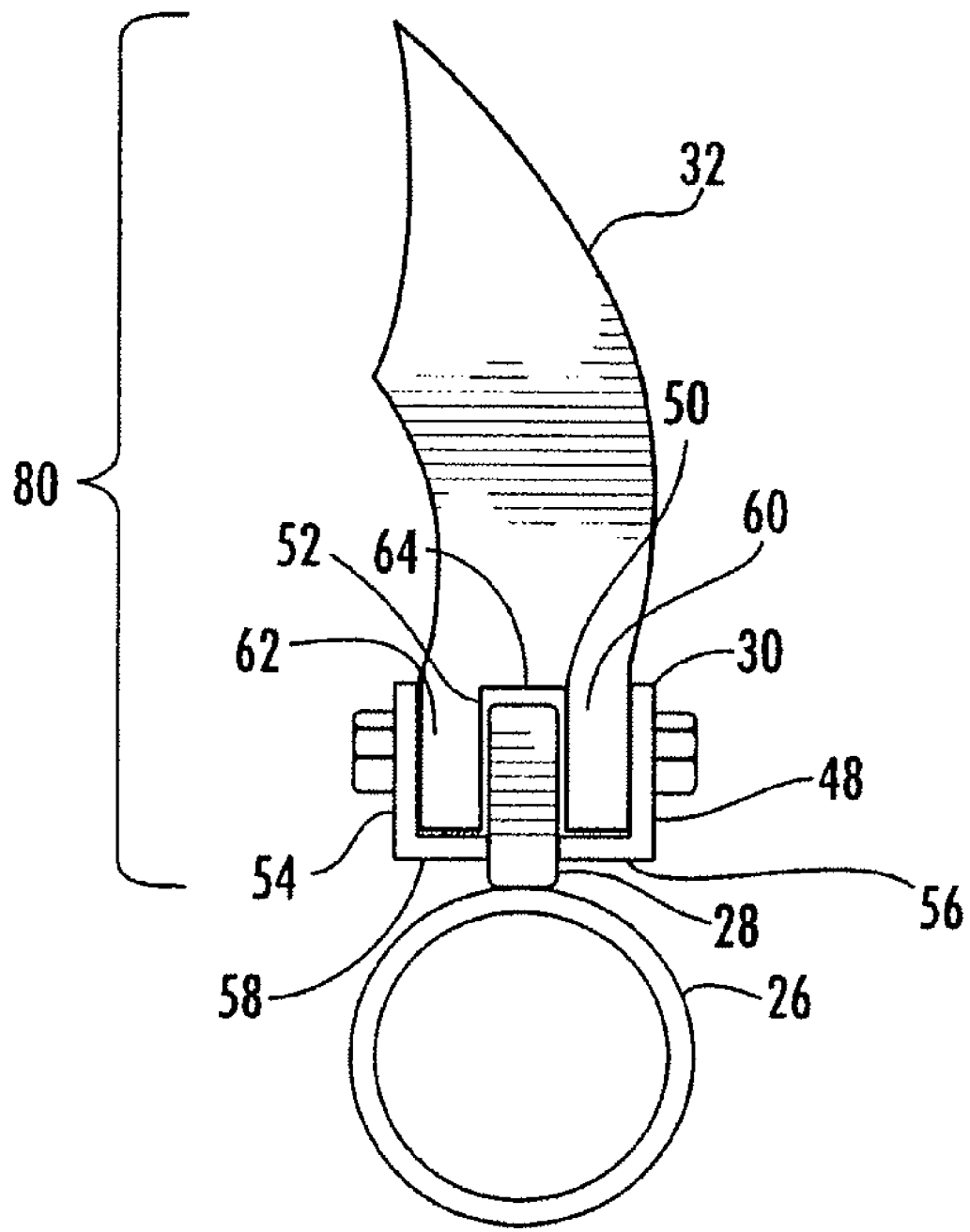
FIG. 4 shows a side elevation view of the preferred embodiment of the present invention shown in FIGS. 2 and 3.

Referring to FIGS. 3 and 4, the blade support 30 is a substantially W-shaped member preferably formed from 14 gauge or 2 mm thick galvanized steel or stainless steel. The blade support can be formed using any one of a number of known processes including: extrusion; fastening together of multiple separate plates; roll forming or press break forming. The blade support 30 comprises a first, second, third, and fourth sidewall 48, 50, 52, 54. The first and second sidewall 48, 50 and third and fourth sidewall 52, 54 are connected by web portions 56, 58 at the lower edge of each sidewall forming a first and second upwardly opening outer channel 60, 62 as is shown in FIG. 2. The second and third sidewalls 54, 56 are connected by a web portion 64 at the upper edge of each sidewall, forming a downwardly opening central channel 66. The central channel 66 is configured to receive the mounting bar 28 in a tongue and groove arrangement.

The formed blade support 30 is pre-punched with a series of aligned apertures in the first, second, third, and fourth sidewalls creating through holes 68 in the blade support 30. The through holes 68 are spaced to correspond with the slots 42 and holes 44 in the mounting bar 28. Similar to the mounting bar 28, the blade support further includes cut marks 205 every 75 mm along the web portions 56, 58 connecting the first and second 48, 50, and third and fourth 52, 54 sidewalls for convenience in cutting the blade support 30 to the desired size and aligning the blade support 30 with corresponding cut marks 46 (FIG. 7) on the mounting bar 28.

Figure 5:
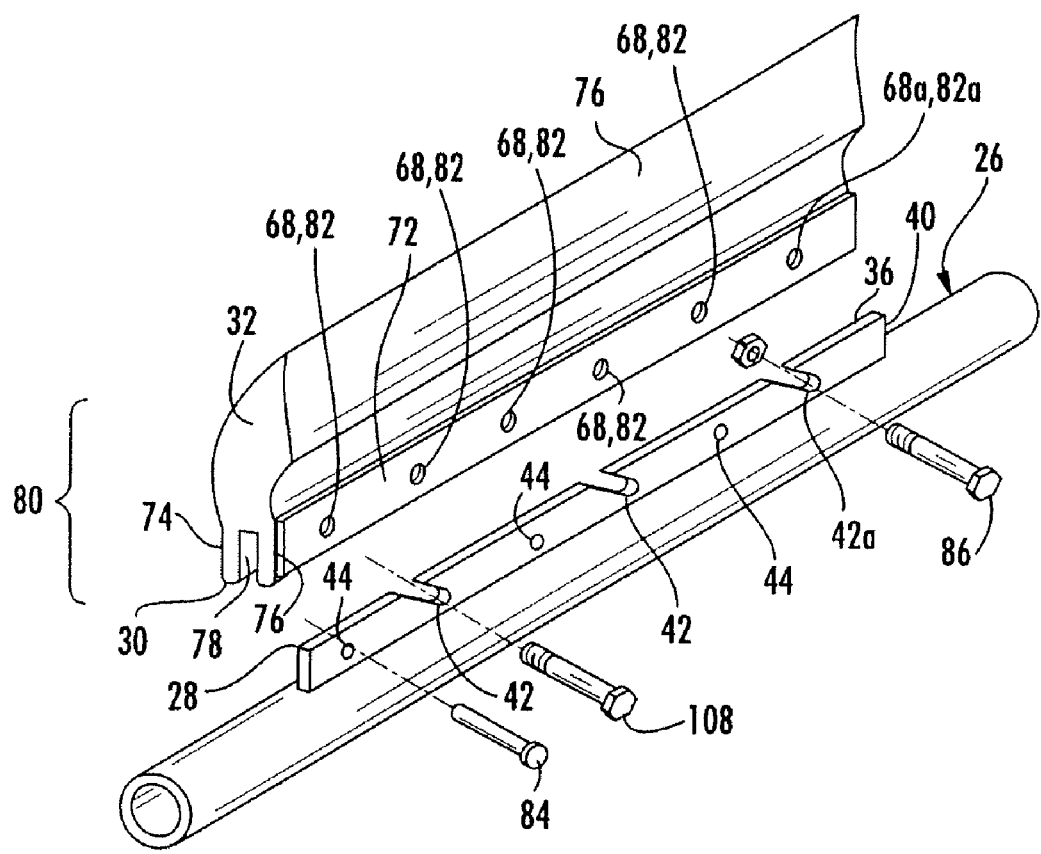
FIG. 5 shows a partial exploded perspective view of the first preferred embodiment of the present invention shown in FIGS. 2-4.

Referring to FIGS. 3-5, the scraper blade 32 is a cast polyurethane blade made pursuant to U.S. Pat. No. 4,917,231 entitled Constant Angle Conveyor Belt Cleaner and U.S. Pat. No. 6,439,373 entitled Constant Angle and Pressure Conveyor Belt Cleaner and Tensioning Arrangement, the disclosures of which are incorporated herein by reference. These patents are assigned to the current applicant and disclose and claim curvilinear scraper blade geometry enabling a scraping surface edge to communicate with the conveyor belt at a constant, optimized angle. Alternatively, the scraper blade 32 can also be an extruded urethane, extruded rubber or molded rubber. The preferred blade 32 is manufactured to 85 to 90 Shore-hardness.

The invention eliminates the aluminum extrusion and the associated milling, metal preparation, bonding and handling activities in the manufacturing process. By using a metal blade support, the blade can be made without bonding to the metal support and assembly becomes a simple assemble-together operation.

The scraper blade 32 comprises an upper, scraping segment 70 and a lower, base portion 72. The base portion comprises a first and second leg portion 74, 76 and a central channel 78, and adopts a profile mirroring that of the blade support 30. In this manner, the first and second leg portions 74, 76 are configured to be received by the outer channels 60, 62 of the blade support 30 and the central channel 78 of the blade 32 is configured to receive the walls of the central channel 66 of the blade support 30 to form the blade assembly 80 (FIGS. 4 and 5). The base 72 of the scraper blade 32 also comprises aligned apertures extending through the first and second leg portions 74, 76 to form through holes 82 in the blade 32. The through holes 82 are correspondingly spaced so as to align with the through holes 68 in the blade support 30 and slots 42 and holes 44 in the mounting bar 28. This spaced arrangement enables fixing elements such as pins, screws, lynch pins or the like to be inserted through the scraper blade, blade support and mounting bar to securely fasten the components to one another during assembly of the belt cleaner as will be described below.

In another preferred embodiment of the scraper blade 32, as shown in FIGS. 9A-C, the blade assembly 80 is comprised solely of a dual durometer scraper blade 32 where the upper, scraper segment 70 of the blade and the lower, base portion 72 have differing hardnesses and physical properties. In this embodiment, the fixing regions include lugs 73 (FIG. 9C) that are cast into the base portion 72 between the first and second leg portions 74, 76, eliminating the use of the shoulder bolts to secure the blade assembly 80 to the mounting bar 28 (FIG. 2), as will be described below. A single lug or a plurality of lugs is positioned on the base portion in a spaced relationship that corresponds to the cut marks 46 (FIG. 7) and retention regions (slots 42 as seen in FIG. 3) on the mounting bar 28 to facilitate ease of assembly of the components. The lugs 73 insert within corresponding slots 42 on the mounting bar 28, where the assembly action is along the central axes of the slots 42. The dual durometer blade of this embodiment eliminates the need for a blade support. If there is a need for additional rigidity between the blade and blade support, additional shoulder bolts can be used in those spaces corresponding to slots in the mounting bar.

The design of the scraper blade 32 and blade support 30 is unique. By separating the functions of the blade 32 and blade support 30, the cost of manufacture is reduced, but flexibility is increased. The blade 32 is designed to have a higher percentage of wearable volume (80%) to total volume but with the same maximum overall height compared to the prior art blade designs for use in similarly intended applications. Accordingly, less raw material is discarded as waste than in current designs.

Additionally, the blade 32 geometry is such that it enables the blade to mount at a minimum mounting distance from the belt surface of any blade design, thus making it universal in the ability to retrofit into existing installations with the minimum amount of rework. The blade 32 is molded with holes already cast into it or if extruded, the holes are punched to correspond to the holes in the blade support 30 and the mounting bar 28 thereby eliminating the need for secondary manufacturing or installation steps.

Figure 13:
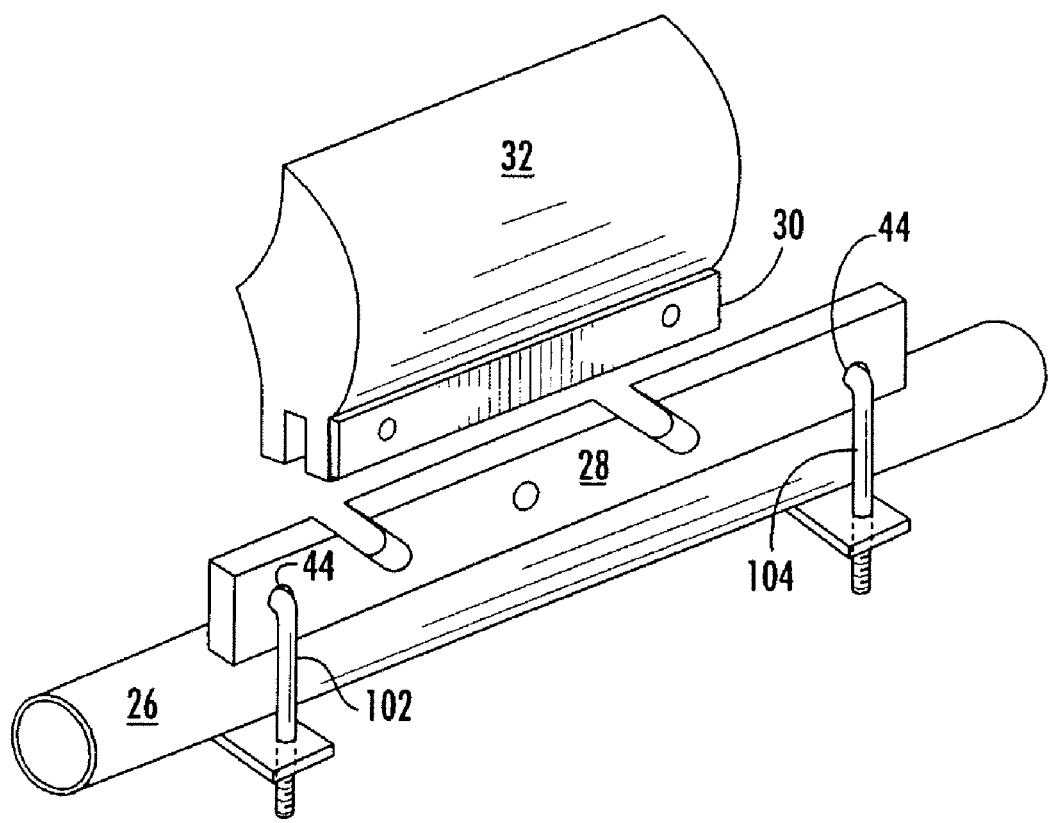
FIG. 13 shows a partial exploded perspective view of an additional preferred embodiment of the present invention.
Figure 14:
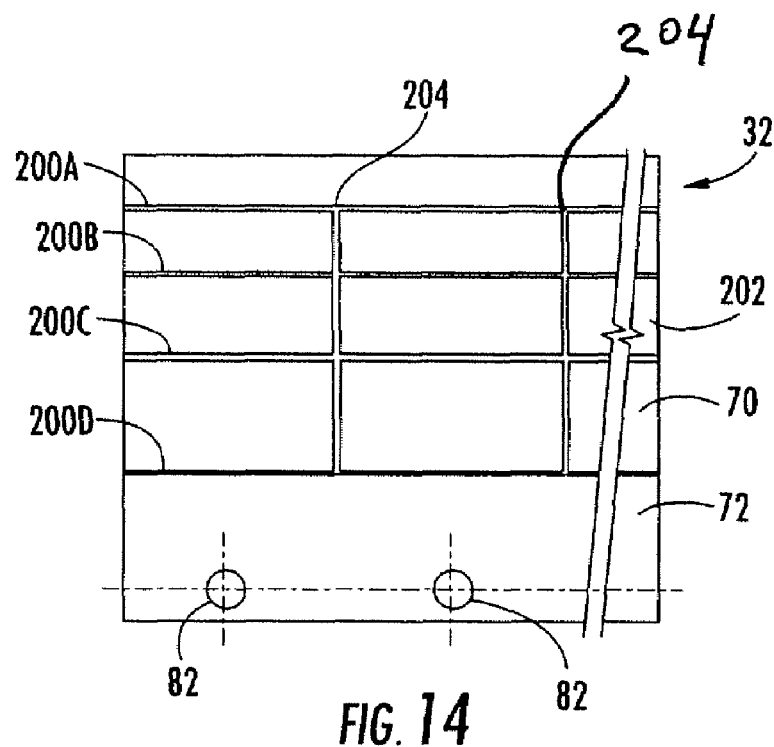
FIG. 14 shows a front elevation view of one version of the scraper blade.
Figure 15:
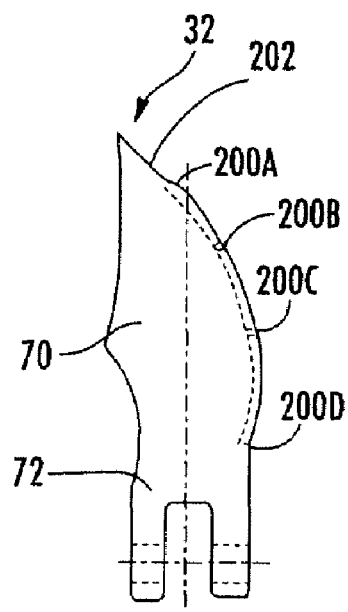
FIG. 15 shows a side elevation view of the scraper blade of FIG. 14.

As is shown in FIGS. 13 and 14, the scraper blade 32 also includes a plurality of elongated ridges 200A-D extending across the front surface of the blade 32. The ridges 200A-D respectively indicate when the scraping element 70 has been worn down such that 25%, 50%, 75% and 100% of the total wear volume of the blade 32 has been worn away. The ridges 200A-D may also be formed as grooves. As is also seen in FIG. 14 and FIG. 9b, the front surface also includes cut lines 204 disposed between the through holes 82 at the base portion 72 of the blade 32.

The construction of the key components described herein exhibit cost reductions and savings over currently existing designs by eliminating the extrusion and bonding of the aluminum blade support to the blade; eliminating slot milling on the mounting bar, reducing non-wear raw materials in the blade, and manufacturing and inventorying the key components in a single, uniform length.

2. Belt Cleaner Assembly Details

Referring to FIGS. 1-4, in the first preferred embodiment of the present invention, the belt cleaner components are assembled in the following manner. The blade 32, blade support 30 and mounting bar 28 are cut to the desired length, utilizing uniformly spaced cut marks to ensure that through holes, holes, and slots in these components all properly align during assembly by the end user of the of the conveyor belt cleaner or distributor of the conveyor belt cleaner components and waste is minimized. The blade 32 and blade support 30 are securely mated to one another to form the blade assembly 80 in a press-fit manner, with the first and second leg portions 74, 76 of the scraper blade 32 securely inserting within the outer channels 60, 62 of the blade support 30 and the walls of the central channel 66 of the blade support 30 securely inserting within the central channel 78 of the scraper blade 32.

The tolerances associated with this press-fit arrangement enable the blade assembly 80 to remain securely assembled during operation of the belt cleaner 24, but also enable the scraper blade 32 to release from the blade support 30 when replacement of the blade 32 is required. The user need only grasp the blade portion and pull with a relatively small force in a direction substantially perpendicular to the longitudinal axis of the blade support to defeat the press-fit and thereby separate the blade from blade support. To insert a different or replacement blade, the same small force is applied in the opposite direction in a substantially perpendicular orientation to the longitudinal axis to join the replacement blade to the blade support. In this manner, the blade support 30 is reusable. Many other combinations of fits between the blade and blade support are possible such as snap or slide together mating geometries.

Molding the blade in long lengths reduces the cost because the labor to mold a single long piece is approximately the same as to mold a blade to size. Additionally if there is a defect in the long length it can simply be cut out and the rest of the blade does not require rework and can still be used efficiently. Made to order blades with defects are either scrapped or remanufactured to a smaller size.

This arrangement is advantageous over prior art blade assemblies that are typically made from cast polyurethane with an extruded aluminum support molded into the base for mating with an upstanding flange on the support frame. The aluminum extrusion is usually cut to length and then machined with the desired holes and/or slots for attachment to the flange. The aluminum extrusion is molded to the urethane blade by a series of steps that require metal preparation and bonding agents. The blade is then typically poured to length. The components of the currently existing, prior art blade assemblies are typically permanently bonded together and are non-separable and non-reusable.

The next step during assembly is to align and mount the blade assembly 80 to the mounting bar 28. The mounting bar 28 is previously affixed to the appropriately sized support frame 26 by welding, glue or adhesive, clamping or the like. In the first preferred embodiment of the present invention, as shown in FIG. 5, fixing regions comprise fixing elements such as pins 84 and bolts 86 that are used to attach the blade assembly 80 to the mounting bar 28.

Preferably the bolts 86 are shoulder bolts of the correct length to prevent over tightening and thus over compressing the blade support and blade combination which would reduce the clearance necessary for the quick removal feature. Preferably, the mounting bar 28 is cut to size to include a slot 42a at the distal end; i.e., the end of the mounting bar that will be placed opposite a side service access to the conveyor (not shown). A shoulder bolt 86 inserts within a through hole 68a, 82a at the distal end of the blade assembly 80 and removably mates with the slot 42a at the distal end of the mounting bar 28.

Upon interconnection of the fixing region and retention region, i.e. shoulder bolt 86 and slot 42a, the blade assembly 80 is aligned with the mounting bar 28 and is rotated towards the mounting bar 28 until the mounting bar 28 comes to rest within the central channel 78 in the blade assembly 80. Whereas all of the slots and apertures are drilled into the blade assembly 80 and mounting bar 28 at a predetermined, standard separation, a through hole 68, 82 at the proximal end of the blade assembly 80 will align with a hole 44 at the proximal end of the mounting bar 28 creating a through hole for insertion of a fixing elements to secure the blade assembly in place. The proximal end of the blade assembly 80 is removably attached to the mounting bar 28 with fixing elements including a lynch pin 84 as seen in FIG. 5 or, in another preferred embodiment, a retainer assembly 88 as seen in FIGS. 10-12.

As is shown in FIGS. 10-12, the retainer assembly 88 comprises a U-shaped urethane body 90 having a first and second leg portion 92, 94 connected by a curved, web portion 96 to define an internal channel 98. The internal channel 98 is configured to receive the mounting bar 28 in tongue and groove relationship. A détente 100 is mounted on an interior surface of the first leg 92 and spans approximately the entire width of the channel 98. During fixation of the retainer 88 to the mounting bar 28, the retainer 88 flexes at the web 96 enabling the internal channel 98 to open and receive the mounting bar 28 and to enable the détente 100 to engage a retention region comprising an aperture 102 at the proximal end of the mounting bar 28. It is apparent from FIGS. 10 and 11 that the mounting bar 28 is cut to a length that is longer than the blade assembly 80. The length of the retainer 88 is designed to enable the first end 104 of the retainer 88 to abut the proximal end 106 of the blade assembly 80 and to secure the blade assembly 80 to the mounting bar 28 by locking the shoulder bolt 86 within the slot 42 on the mounting bar 28.

Referring to FIG. 3, 4, 8 and 10, the hole and slot design of the mounting bar 28 allows for a single pin 84 or retainer assembly 88 to fix the blade assembly 80 to the mounting bar 28, where the blade assembly 80 can be removed quickly and easily by removing the single pin 84 or disengaging the détente 100 and retainer 88. The slots 42 in the mounting bar 28 eliminate the need for removing the distal end fixing method, i.e., the shoulder bolt 86, by enabling the blade assembly 80 to slide from engagement with the mounting bar 28.

It is contemplated that additional shoulder bolts 108 (FIGS. 5, 10 and 11) may be used to further secure the blade assembly 80 to the mounting bar 28. Likewise, additional fixing pins may also be utilized to further secure the blade assembly to the mounting bar.

Referring to FIGS. 5, 10 and 11, removal of the blade assembly 80 from the mounting bar 28 requires reversing the steps described above. First, all fixed pins 84 and/or the retainer 88 is disengaged and removed from the holes 44. This enables the shoulder bolts 86 (and 108) to disengage the slots 42 in the mounting bar 28, freeing the blade assembly 80 from secure attachment with the mounting bar 28. The blade assembly 80 may then be removed from the conveyor chute and the blade replaced or the conveyor components cleaned or otherwise maintained.

Referring to FIG. 8, the retention regions of the mounting bar 826 comprise randomly shaped apertures including a dog-leg or L-shaped slot 828. When the scraper blade is attached to the mounting bar with a pin, lug or shoulder bolt engaging the L-shaped slot 828, the disassembly action first comprises moving the scraper blade first in a direction substantially parallel to the longitudinal axis of the mounting bar 826. The scraper blade is then moved in a second direction that is not parallel to the longitudinal axis of the mounting bar. In the L-shaped slot mounting bar, this second direction is substantially perpendicular to the first direction.

Referring back to the embodiment of the present inventive belt cleaner shown in FIGS. 9A-C, the lugs 73 cast integrally and transversely into the base portion 72 of the scraper blade 32 are spaced to correspond with the spaced slots 42 (FIG. 3) on the mounting bar 28. During assembly, the scraper blade 32 and lug or lugs 73 travel along the top surface 38 (FIGS. 3-5) of the mounting bar 28 until the lug or lugs 73 engage a slot or slots 42. The slots 42 are straight, angled slots disposed on the mounting bar 28 at approximately 45 degrees from horizontal. The mounting bar comprises a longitudinal axis that can be substantially horizontal. The slots 42 also comprise a central axis that extends through the length of the slot. The lug or lugs 73 and slots 42 are constructed with enough tolerance to enable easy insertion of a lug 73 within a slot 42 when the scraper blade 32 travels along the top surface 38 of the mounting bar 28. The assembly action is substantially parallel to the central axis that extends through the length of the slot 42.

Movement of the blade 32 that is not parallel to the assembly action, results in an interference fit between a lug 73 and corresponding slot 42 as one section of the blade 32 will be higher or lower than the remainder of the blade 32. This natural interference due to the "tipping" of the blade 32 may be created by: (1) applying a force parallel but opposite to the assembly action and not in line with the central axis of the slots 42: (2) applying a force parallel to the support frame 26 and mounting bar 28; (3) or reversing to the direction of the conveyor belt, resulting in pulling the blade upward by the friction between the blade and belt. The forgiving nature of the urethane allows the lug 73 to deform enough to overcome this interference, enabling lug to disengage the slot and enabling the scraper to disengage the mounting bar.

This construction reduces the need to use shoulder bolts, retainers and pins to secure the blade 32 to the mounting bar 28. Accordingly, the scraper blade 32 may be fabricated without through holes 82 (FIGS. 3-5) and the mounting bar 28 may be fabricated without holes 44 (FIG. 3-5). It is, however, contemplated that a mounting bar with hole and slot patterned apertures may be used, and shoulder bolts, retainers, pins, and the like can be employed to further secure the scraper blade 32 to the mounting bar 28.

As was described herein, the mounting bar is preferably welded to the support frame. However, it is contemplated that the mounting bar can also be clamped, glued or screwed to the support frame. In another preferred embodiment, shown in FIG. 13, the mounting bar 28 is cut longer than the blade 32 and blade support 30 to expose a slot or aperture 44 at the distal and proximal ends of the mounting bar 28. A first U-bolt 102 is inserted through the exposed slot or hole 44 at the distal end and around the support frame 26 and second U-bolt 104 is inserted through the exposed slot or hole 44 at the proximal end and around the support frame 26. Tightening of the U-bolts 102, 104 will securely hold the mounting bar 28 to the support frame 26.

Typically, belt cleaners are built to specification at the point of manufacture with all apertures and slots predrilled at specific locations, placing the burden on the manufacturer to stock all parts required for the belt cleaner assembly and to calculate the components lengths required to be cut from raw materials to minimize waste. Many of the features of the belt cleaner components described above enable the components of the present inventive belt cleaner to be manufactured in standard lengths and cut to size, post-manufacture, as needed for specific applications. This enables the manufacturer of the components to manufacture and store the components in standardized, uniform lengths. The distributor or end user of the belt cleaner purchases the blade, blade support and mounting bar in long standard lengths and then cuts them to the desired size depending on the requirements of the specific application.

Optimal standardized lengths can be selected to limit or eliminate waste when cutting the parts to size. The components are typically cut 75 mm shorter than the belt width. The blade can be cut with a saw or guillotine cutter. The blade support and mounting bar can be cut with a metal cutting saw. The support frame is cut to length typically 300 to 450 mm or 12 to 18 inches wider than the belt. The mounting bar is welded to the support frame using the appropriate welding rod or wire and in a manner that minimizes warping of the support frame.

Figure 16:
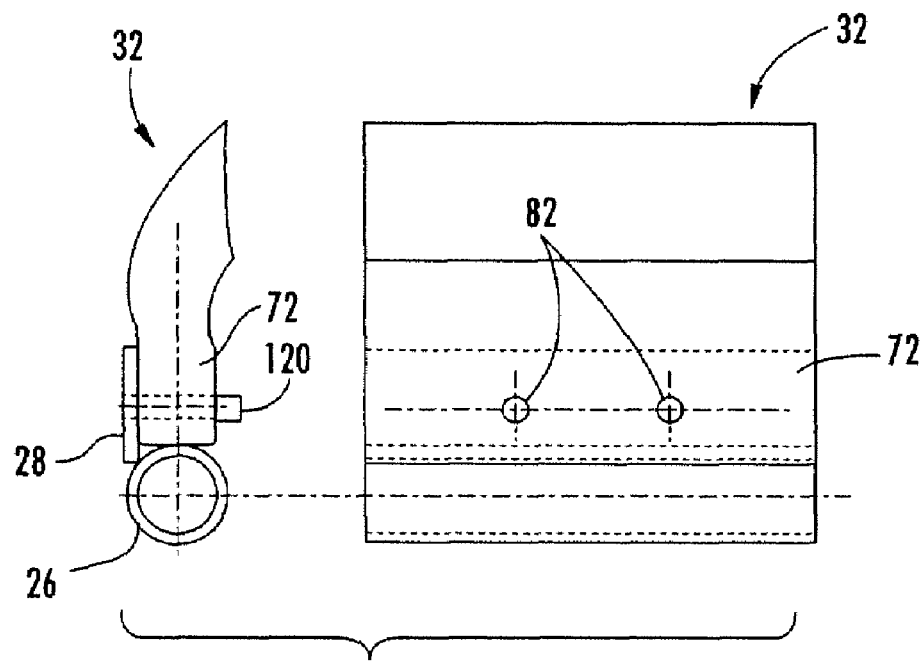
FIGS. 16, 17 and 18 show elevation views of additional preferred embodiments of the present invention.
Figure 17:
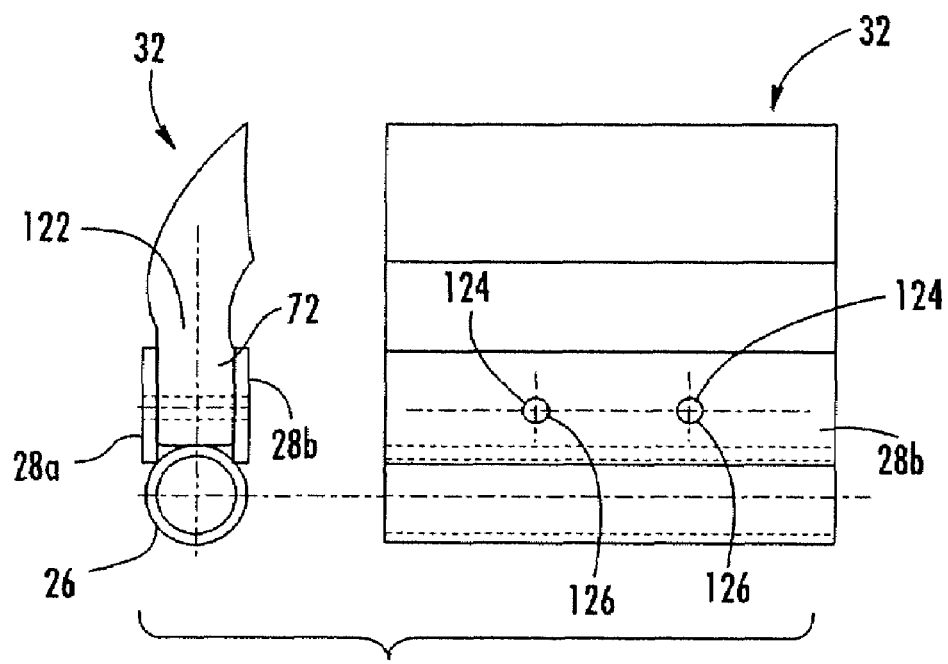
Figure 18:
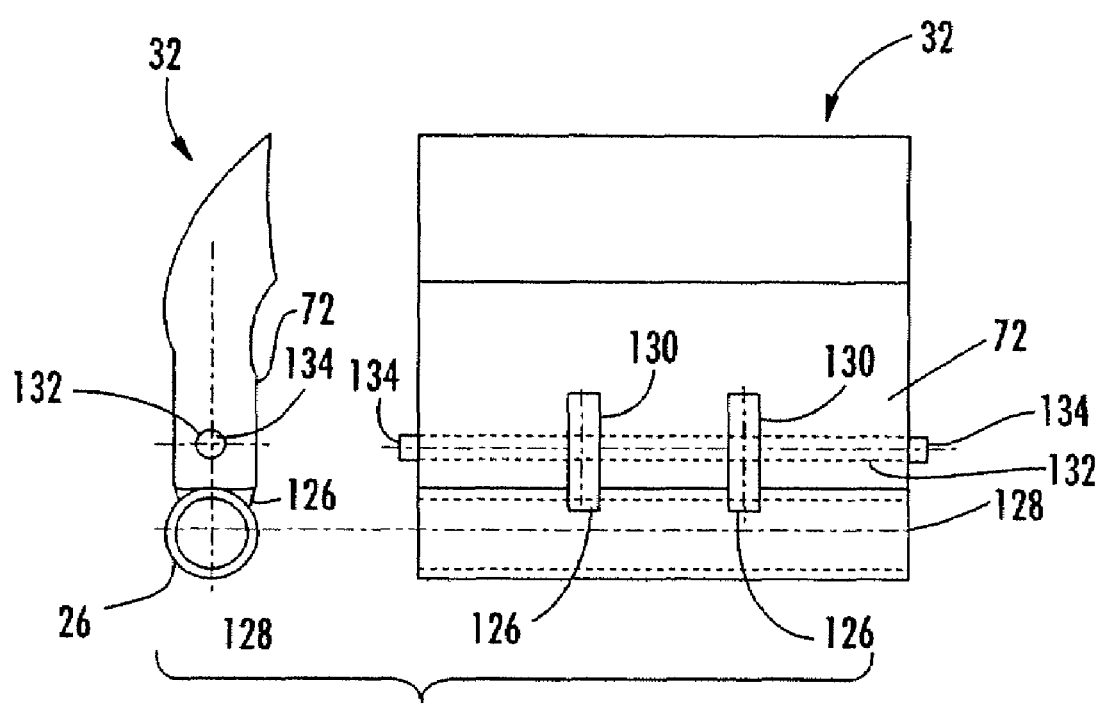

FIGS. 16, 17 and 18 show additional preferred embodiments of the present invention. Referring to FIG. 16, a blade 32 is manufactured with a solid base portion 72 eliminating the need for a blade support for added stability. The base portion 72 includes a plurality of through holes 82 separated by a uniform distance. The blade 32 mounts to a support frame 26 and mounting bar assembly 28 where the mounting bar 28 comprises a metal flange eccentrically mounted to the support frame 26. Pins 120 extend from the mounting bar 28 and align and insert within the through holes 82 in the base portion 72 to couple the blade 32 to the mounting bar 28.

The assembly shown in FIG. 18 is similar to the assembly of FIG. 16. A first and second mounting bar 28a, 28b are eccentrically mounted to the support frame 26 in parallel, spaced relationship and form a receiving space 122 for the base portion 72 of the blade 32. Through holes (not shown) in the base portion 72 align with holes 124 in the mounting bars to form channels 126 for receiving fixing elements, such as pins, to secure the blade 32 within the receiving space 122.

FIG. 17 shows another preferred embodiment comprising scraper blade 32 with a solid base portion 72. Cross flanges 126 are equidistantly spaced along the support frame 26, perpendicular to the central axis 128 of the support frame 26 and are configured to be received by corresponding slots 130 in the base portion 72 of the blade 32. The cross flanges 126 include a central bore (not shown) that aligns with a central channel 132 in the blade base 72 when the blade 32 is mounted on the cross flanges 126. An elongated pin inserts within the central channel 132 and through the central bores to fix the blade 32 to the support frame 26.

The use of uniform, equidistantly spaced through holes and apertures in the embodiments shown in FIGS. 16, 17, and 18 enables the distributor of the component parts or end user of the conveyor belt cleaner to easily cut the component parts to the desired size and properly align the components for secured attachment to one another.

The present invention provides unprecedented flexibility in the manufacture and distribution of engineered belt cleaning systems. The standard length is determined by the manufacturers' history of made to order products so that the total amount of annual waste is minimized. The spacing of the apertures, 75 mm, (75 mm=2.95 which is a nominal 3 inches), in the blade, blade support and mounting bar was chosen as the preferred embodiment to accommodate easy cross over between imperial and metric systems. Because only the components that require advanced engineering design are manufactured and supplied by the manufacturer, the end user can adapt the components to any suitable structural support including already installed engineered belt cleaning systems or even home made belt cleaner systems. Waste is minimized because in the present invention all of the pre-engineered components can be used in an unlimited combination. For example, left over short lengths of the mounting bar can be welded together to make longer lengths. Another example of the flexibility and economy of the system is that short lengths of blade can be stacked in the blade support and secured with a bolt to use up scrap or create customized segmented blade combinations. Multiple durometer urethanes or combinations of new and slightly worn segments can be arranged in this manner due to the fundamental design of the system.

3. Method of Distribution

In a preferred embodiment of this method of manufacture and distribution, at least one of a first, second or third key components, i.e., the blade, blade support and/or mounting bar, are manufactured to a standard 2700 mm (106.3 inch) length at a first point of fabrication, i.e., the point of manufacture, to keep manufacturing and inventory costs down. The standard 2700 mm (106.3 inch) lengths of component materials are then sold to a distributor or the end user and customized to specification by either of these two entities. A first common component, i.e., support frame, the least complex component to obtain, is typically supplied by the distributor or end user at the second point of fabrication, and is incorporated with the key components downstream from the manufacture of the key components at this second point of fabrication. The distributor or end user of the conveyor belt cleaner assembly will stock the key components in standard lengths. The distributor or end user will also supply the common component support frame. This provides the distributor or end user with the opportunity to cut the key components and common component to the desired length, affix the mounting bar to the support frame and assemble the conveyor belt cleaner. As has been previously discussed, the hole and slot pattern in the mounting bar enables the end user or distributor to cut the key components to size without compromising the fixing system.

The aforementioned assembly makes it possible to provide belt cleaner kits in Point of Sale ("POS") packaging and displays. The kits would contain components that are cut to size for popular belt widths and packaged in shrink wrap packages or the like, containing installation instructions. An end user could then purchase a blade replacement kit to adapt to a particularly existing conventional belt cleaner frame or for replacement of a worn replacement blade for the system of the present invention. Such POS product would, in the preferred embodiment, be provided for the following belt sizes: 600 mm, 750 mm, 900 mm, 1050 mm ; and 1200 mm and, 24-inch, 30-inch, 36-inch, 42-inch, 48-inch. Other ranges of sizes that would cover the more popular or industry specific belt widths are also contemplated by the system of the present invention.

These methods of distribution avoid the need to stock or supply 50 different common sizes of blades and assemblies. Moreover, the manufacture, stocking and shipping of longer than needed lengths makes it easier to forecast and time the manufacture and shipping of replacement key components and POS kits based on sales histories and trends for particular distributors.

The system of the present invention further contemplates that the manufacturer of the key components can track orders of each of the various key components by distributor or end user as to number of pieces, dollar amount and history so as to comprise a trend both as to magnitude and/or timing of orders. This could be done by using a computer-based database or software program capable of analyzing and recording such purchasing data. From this distributor or Original Equipment Manufacturer ("OEM") data, the manufacturer can forecast, plan and/or prepare the ordering of raw materials as well as the manufacture and shipping of the key components.

Figure 19:
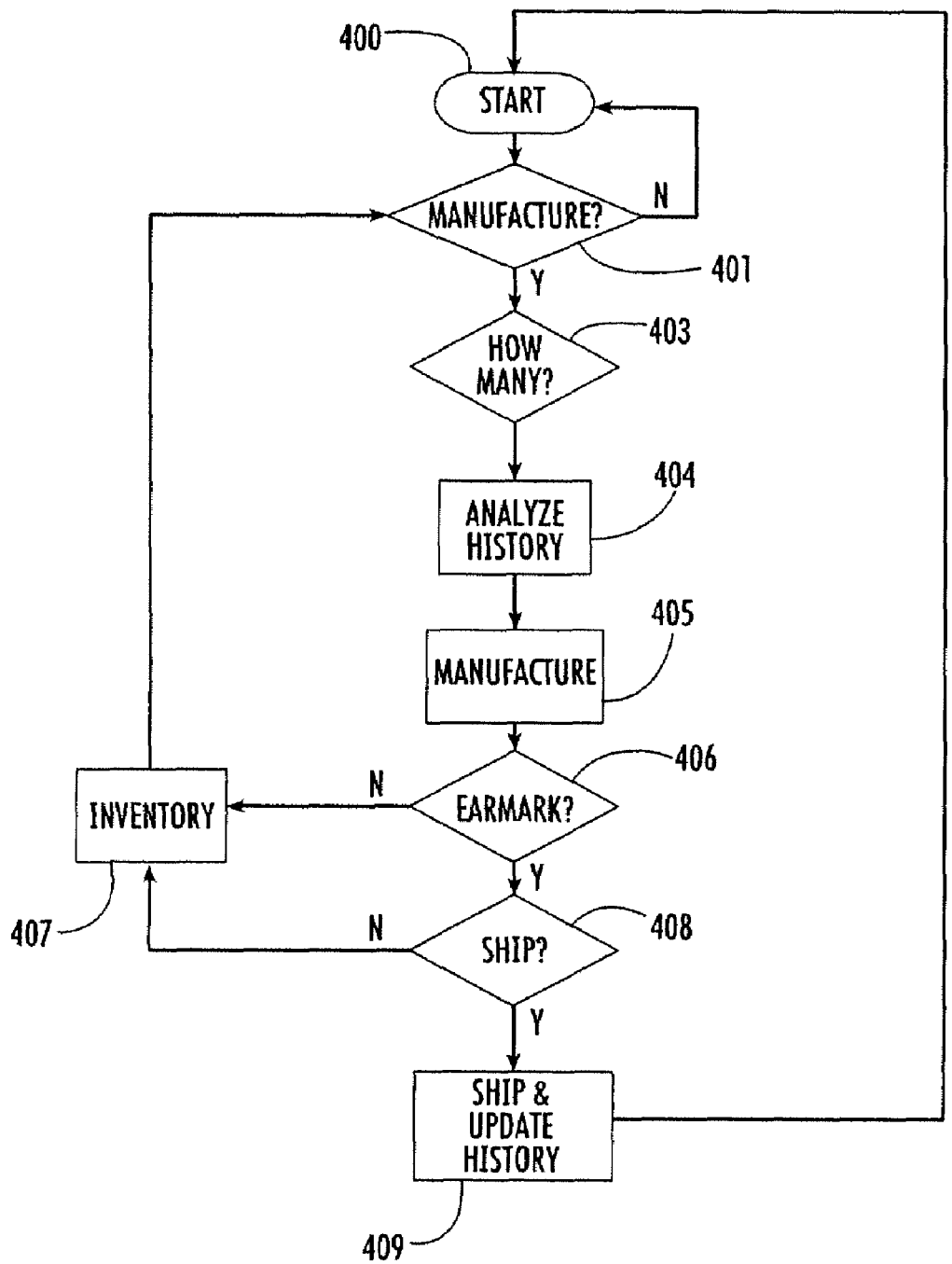
FIG. 19 is a flow chart of a method of using order histories to determine inventory levels.

FIG. 19 shows a flow chart for using purchase and order histories to help determine and/or forecast the time and magnitude of manufacturing, inventory and shipments of the standard length, key components.

Referring to FIG. 19, the decision needs to be made as to whether to manufacture more of one or more of the key components 401. If the decision is made to manufacture more of a key component 401, then the question becomes "how many" 403. The history showing timing and amounts of prior purchases of that key component is reviewed for either all customers, a single customer or a selected group of customers 404. Based on that purchase history or trend based thereon, the amount to be manufactured is determined and the requisite key components are manufactured 405. Depending upon the magnitude and timing of prior purchases of key components by one customer, the decision is made as to whether or not to "earmark" certain of the key components by customer 406. If products are not to be earmarked for one or more customers, then they are sent to inventory 407. If they are earmarked based on the purchase history 406, then it must be decided whether to ship the key product to the customer 408. If not, the product is held in inventory 407 under that customer's name until an order is received or the appropriate time for shipment 409. Alternatively, the earmarking step can be skipped and key components either shipped to the customer or inventoried depending upon the past purchase history and timing of the customer and/or other customers. If shipped, then the purchase history is updated. Accordingly, based on the purchase history information, the manufacturer can project or forecast such business information as: inventory levels; production schedules; cash flow; and/or procurement of raw materials.

In that way, a customer's projected re-order can be manufactured and ready to ship before the customer formally places the reorder.

In an alternative embodiment, the invention would include a computer-based system including a relational database for each customer based on inventory, pre-determined parameters and the number of key components required for each conveyor belt width used by the customer. An algorithm is applied to the data to calculate cutting schedules for cutting the standard long lengths of key components and calculating the resulting percentage waste generated by the cutting schedule. If the resulting percentage waste is less than a pre-determined value, then the cutting scheduling proceeds. If not, a new schedule is calculated that has an acceptable resulting waste percentage.

It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

I claim:

1. A blade assembly for a conveyor belt cleaner comprising:
    a scraper blade operably connected to a mounting assembly, the mounting assembly configured to maintain the scraper blade in an operative position in communication with a conveyor belt;
    the mounting assembly comprising a mounting bar for releasable attachment of the scraper blade thereto and the mounting bar configured to enable replacement of the scraper blade; and
    a blade support operably interposed between said blade and the mounting bar and operably configured thereto to removably and releasably receive the scraper blade and further configured to operably attach the scraper blade to the mounting bar, at least a portion of the blade support being directly attachable to at least a portion of the mounting bar;
    wherein the scraper blade, mounting bar, and blade support each include a plurality of uniformly separated guides disposed thereon.

2. The blade assembly of claim 1 wherein the mounting bar further comprises a plurality of uniformly spaced apertures configured to receive a first fixing element operatively associated with the scraper blade for securing the scraper blade to the mounting bar.

3. The blade assembly of claim 2 wherein said apertures are spaced approximately 75 mm apart.

4. The blade assembly of claim 2 wherein the plurality of apertures comprises a first hole and a first slot in the mounting bar.

5. The blade assembly of claim 4 wherein the first fixing element comprises a shoulder bolt configured to be received by the first slot.

6. The blade assembly of claim 4 wherein the first fixing element comprises a pin configured to be received by the first hole.

7. The blade assembly of claim 4 wherein the first fixing element comprises a retainer configured to be received by the first hole.

8. The blade assembly of claim 4 wherein the first fixing element comprises a lug integrally formed within the scraper blade, the lug configured to be received by the first slot.

9. The blade assembly of claim 4 further comprising a second fixing element, the first fixing element configured to be received by the first slot and the second fixing element configured to be received by the first hole.

10. The blade assembly of claim 4 wherein the scraper blade comprises a first through hole configured to align with the first slot in the mounting bar to facilitate insertion of the first fixing element through the first through hole and first slot to securely mate the scraper blade to the mounting bar.

11. The blade assembly of claim 4 wherein the scraper blade comprises a first through hole configured to align with the first slot in the mounting bar to facilitate insertion of the first fixing element through the first through hole and first hole to securely mate the scraper blade to the mounting bar.

12. The blade assembly of claim 1 wherein the plurality of uniformly spaced apertures comprises an alternating pattern of slots and holes.

13. The blade assembly of claim 1 wherein the mounting bar further comprises a plurality of uniformly separated guides disposed on the mounting bar, the guides configured to facilitate cutting of the mounting bar into segments and to facilitate aligning of the mounting bar with the scraper blade.

14. The blade assembly of claim 1 wherein the scraper blade comprises a first portion with a first hardness and a second portion with a second hardness.

15. A blade assembly for a conveyor belt cleaner comprising:

a scraper blade operably connected to a mounting assembly, the mounting assembly configured to maintain the scraper blade in an operative position in communication with a conveyor belt;
the mounting assembly comprising a mounting bar for releasable attachment of the scraper blade thereto and the mounting bar configured to enable replacement of the scraper blade; and
a blade support having a longitudinal axis and operably interposed between said blade and the mounting bar and operably configured thereto to removably and releasably receive the scraper blade and further configured to operably attach the scraper blade to the mounting bar; wherein the blade support is configured to receive the scraper blade and to form a blade assembly, the blade support comprising a plurality of uniformly separated guides disposed on the blade support so as to intersect a line substantially parallel to the longitudinal axis of the blade support, the guides configured to facilitate cutting of the blade assembly into segments and to facilitate aligning of the blade assembly and mounting bar.

16. A conveyor belt cleaner for cleaning a surface of a conveyor belt, the conveyor belt cleaner comprising:
a) a plurality of key components manufactured in long lengths comprising:
a mounting member comprising a first surface and a first plurality of apertures;
a scraper blade comprising a first surface; and, a blade support configured to releasably engage the scraper blade and to securely fasten the blade support and scraper blade to the mounting member, the blade support comprising a first surface and a second plurality of apertures; and,
b) cut marks at spaced intervals disposed along the first surfaces of at least two of the key components, the cut marks configured to enable cutting of the key components into shorter, matched lengths with the first plurality of apertures and second plurality of apertures in substantially aligned relationship.

17. A blade assembly for a conveyor belt cleaner comprising:
a scraper blade operably connected to a mounting assembly, the mounting assembly configured to maintain the scraper blade in an operative position in communication with a conveyor belt and comprising a mounting bar, the mounting bar having a longitudinal axis and configured to releasably receive the scraper blade;
a first retention region disposed in the mounting bar, the first retention region comprising a central axis extending the length of the retention region, the central axis not being parallel or perpendicular to the longitudinal axis of the mounting bar;
a first fixing region integrally formed with the scraper blade and configured to be releasably received within the first retention region of the mounting bar along the central axis so as to operably attach the scraper blade to the mounting bar; and the scraper blade capable of detaching from the mounting bar along the central axis.

18. The blade assembly of claim 17 wherein the fixing region comprises a lug integrally and transversely formed with said scraper blade.

19. The blade assembly of claim 17 wherein the first retention region comprises an angled, open-ended slot formed in the mounting bar.

20. The blade assembly of claim 19 wherein the first angled slot is positioned 45 degrees from horizontal.

21. The blade assembly of claim 17 wherein the mounting bar further comprises a first aperture disposed in the mounting bar, the first aperture configured to receive a second fixing element operatively associated with the scraper blade.

22. The blade assembly of claim 21 wherein the first aperture comprises a second angled slot and the second fixing element comprises a second lug integrally formed with the scraper blade.

23. The blade assembly of claim 21 wherein the first aperture comprises a bore and the scraper blade comprises a first through hole configured to align with the bore to facilitate insertion of the second fixing element through the first through hole and bore.

24. The blade assembly of claim 23 wherein the second fixing element comprises a shoulder bolt.

25. The blade assembly of claim 23 wherein the second fixing element comprises a pin.

26. The blade assembly of claim 21 wherein the first aperture comprises a bore and the second fixing element comprises a retainer.

27. The blade assembly of claim 21 wherein the first angled slot and first aperture are spaced approximately 75 mm apart.

28. The blade assembly of claim 17 wherein the mounting bar further comprises a plurality of uniformly spaced guides disposed on the mounting bar, the guides configured to facilitate cutting of the mounting bar into segments and to facilitate aligning of the mounting bar and scraper blade.

29. The blade assembly of claim 17 wherein the scraper blade comprises a first portion with a first hardness and a second portion with a second hardness.

30. The blade assembly of claim 17 wherein the scraper blade comprises a base portion having first and second leg portions and the lug is positioned between the first and second leg portions.

31. The blade assembly of claim 17 wherein the mounting bar further comprises a plurality of angled slots in spaced relationship and the scraper blade further comprises a plurality of lugs in spaced relationship corresponding to the spaced relationship of the plurality of angled slots.

32. A blade for a conveyor belt cleaner having a mounting assembly with a longitudinal axis comprising:
a scraper blade capable of being operably connected to the mounting assembly for maintaining the scraper blade in an operative position in communication with a conveyor belt;
a first retention region disposed in the mounting assembly, the first retention region comprising a central axis extending the length of the retention region, the central axis not being parallel or perpendicular to the longitudinal axis of the mounting assembly;
a first fixing region integrally formed with the scraper blade and configured to be capable of being releasably received within the first retention region of the mounting assembly along the central axis so as to in turn be capable of operably attaching the scraper blade to the mounting assembly; and
the scraper blade capable of detaching from the mounting assembly along the central axis.

33. The blade assembly of claim 32 wherein the fixing region comprises a lug integrally and transversely formed with said scraper blade.

34. The blade assembly of claim 32 wherein the first retention region comprises an angled, open-ended slot formed in the mounting assembly.

35. The blade assembly of claim 34 wherein the angled slot is positioned 45 degrees from horizontal.

36. A blade for a conveyor belt cleaner having a mounting assembly with a longitudinal axis comprising:
- a scraper blade capable of being operably connected to the mounting assembly for maintaining the scraper blade in an operative position in communication with a conveyor belt; a first retention region disposed in the mounting assembly;
- a first fixing region integrally formed with the scraper blade and configured to be capable of being releasably received within the first retention region of the mounting assembly so as to in turn be capable of operably attaching the scraper blade to the mounting assembly; and
- the scraper blade being detachable from the mounting assembly only by movement of the scraper blade in a linear direction that is oblique to said longitudinal axis of the mounting assembly.

37. The blade assembly of claim 36 wherein the linear direction is at an angle of approximately 45 degrees, relative to the longitudinal axis of the mounting assembly.

38. The blade assembly of claim 36 wherein the fixing region comprises a lug integrally and transversely formed with said scraper blade.

39. The blade assembly of claim 36 wherein the first retention region comprises a slot formed in the mounting assembly.

40. The blade assembly of claim 36 wherein said first retention region comprises a slot formed in the mounting assembly at an oblique angle, relative to the longitudinal axis of the mounting assembly.

* * * * *